United States Patent

[11] 3,598,961

[72] Inventor Nathaniel E. Hager, Jr.
    Lancaster, Pa.
[21] Appl. No. 861,694
[22] Filed Sept. 29, 1969
[45] Patented Aug. 10, 1971
[73] Assignee Armstrong Cork Company
    Lancaster, Pa.

[54] METALLIC CONTAINER WITH AN INTEGRAL SPLIT-ELECTRODE SERIES-LAMINATED HEATER
1 Claim, 2 Drawing Figs.

[52] U.S. Cl. ................................. 219/438,
    219/436, 219/521, 219/543, 219/552
[51] Int. Cl. .................................... F27d 11/02
[50] Field of Search .................................... 219/224,
    294, 385, 438—442, 432—436, 528—531,
    543—549; 338/212, 309, 99

[56] References Cited
UNITED STATES PATENTS
| 1,978,089 | 10/1934 | Jones | 219/432 |
| 2,493,923 | 1/1950 | Montone | 219/294 |
| 3,033,970 | 5/1962 | Eisler | 338/212 X |
| 3,061,501 | 10/1962 | Dittman et al. | 219/543 X |
| 3,092,704 | 6/1963 | De Woody et al. | 219/385 |
| 3,125,739 | 3/1964 | Deibel et al. | 338/99 |
| 3,221,145 | 11/1965 | Hager, Jr. | 219/549 |
| 3,448,246 | 6/1969 | Armbruster | 219/528 |
| 3,505,498 | 4/1970 | Shevlin | 219/385 |

FOREIGN PATENTS
| 1,230,097 | 3/1960 | France | 219/528 |

Primary Examiner—Volodymyr Y. Mayewsky
Attorney—Clifford B. Price

ABSTRACT: The electrical heater is provided for heating containers of food. The wall of the container may constitute a portion of the heater structure or the heater may be composed of three laminated structures fastened to a food container. The heater has a split electrode, both parts on the same side of an electrically conductive material. On the opposite side of the conductive material is the wall of the container or a conductive sheet. Principal current flow is from one of the split electrodes through the conductive layer to the large conductive sheet and then back through the conductive layer to the second split electrode.

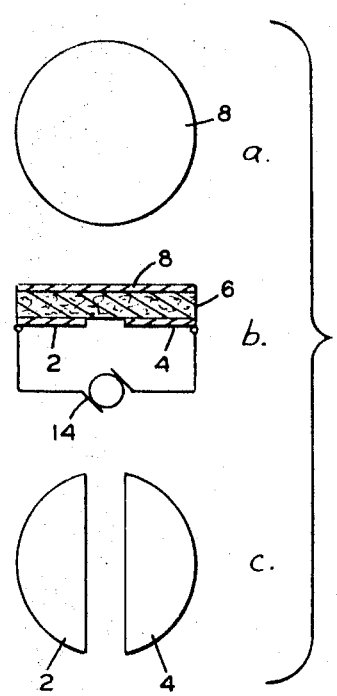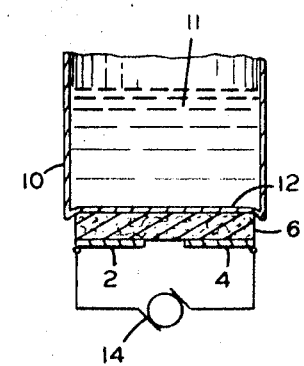

METALLIC CONTAINER WITH AN INTEGRAL SPLIT-ELECTRODE SERIES-LAMINATED HEATER

BACKGROUND OF THE INVENTION

1. Field of the Invention

This invention relates generally to an electric heater and more particularly to a split-electrode series-connected laminated heater. Still more particularly, the invention relates to a laminated heater which is to be used with a food container.

2. Description of the Prior Art

Laminated-type electrical heaters have been disclosed in the prior art, for example, in U.S. Pat. No. 3,264,595, wherein there is disclosed a three-electrode laminated heater. Also, there has been utilization of heating devices in conjunction with packages for foodstuffs as shown in U.S. Pat. No. 3,296,415. Such structures have even utilized laminated-type heaters with both electrodes on the same side of the laminated structure.

It is the object herein to provide a heater which may be in combination with a food container for the purpose of providing an efficient and commercially successful heater which may be fastened to the underside of a food container to rapidly warm the material within the container. The heater must readily adapt to an electrical generator or power source for the purpose of supplying the current necessary for the heater to operate to deliver heat at a uniform rate per unit area. The heater must be capable of receiving the normal rough handling that is associated with high-speed production lines, and finally, the heater must provide for rapid heating of the foodstuff within the container with minimum power output.

SUMMARY OF THE INVENTION

The invention is directed to the heater structure which may be used with a food container and may actually incorporate a wall of the container. The heater is formed by the use of two separated electrodes, preferably of the same area, which are conductively bonded on the same side of a conductive layer. On the opposite side of the conductive layer is conductively bonded a conductive sheet or coating which covers the complete opposite side of the conductive layer. Current flow is from one of the split electrodes through the conductive layer to the conductive coating, along the conductive coating, back through the conductive layer to the second split electrode. The flow of the current causes heat to be generated by electrical resistance, and this heat will be transmitted to the foodstuff within a container to which the heater may be fastened. The wall or bottom of the container may actually be used as the conductive coating on the conductive layer. IN the open market, the food container will be sold with the heater an integral part thereof and, due to its low cost, the heater will be disposable along with the food container. The split-electrode structure will permit the heater to readily connect with the contacts of an electrical generator for the purpose of providing power to the heater. By having both electrodes in a side-by-side relationship, the need for leads from the electrodes to the power supply is eliminated and, in actual practice, the container with the foodstuff and heater need only be placed on a receptacle which is part of the power supply to provide the connecting coaction between the power supply and the heater. Positioning of the heater on the bottom of a food container helps cause rapid heating due to heat flow by convection in the liquid-containing food.

BRIEF DESCRIPTION OF THE DRAWING

FIG. 1 is a view of the heater wherein FIG. 1A is a top view, FIG. 1B is a cross-sectional view, and FIG. 1C is a bottom view of the heater, and FIG. 2 is a view of a modification of the heater incorporated with a food container.

DESCRIPTION OF THE PREFERRED EMBODIMENT

The heater structure is shown in FIG. 1. The split electrodes are semicircular in shape as shown in FIG. 1C, and these split electrodes 2 and 4 are spaced from each other by a distance which exceeds the thickness of the conducting layer 6 so that there is no overheating in the gap area due to excessive current flow from split electrode 2 through layer 6 to split electrode 4 without the current passing through layer 8. However, the gap should not be too great or else there will be a lack of heating in the center portion of the heater where the gap exists. The gap width is adjusted so heating in the gap region caused by current flow parallel with the electrodes equals heating elsewhere due to current flow perpendicular to the electrodes. An approximate calculation indicates the gap width should be equal to twice the conductive layer thickness if the material is isotropic, and greater if the material conductivity parallel to the electrodes exceeds that perpendicular to the electrodes. The two electrodes 2 and 4 are fastened to one surface of the conductive material 6 and lie within a flat plane. On the opposite surface of the conductive material or layer 6, there is fastened a conductive coating or sheet 8 which covers the complete upper surface of layer 6, as best seen in FIG. 1A.

FIG. 2 is a modification of FIG. 1 wherein the conductive coating 8 has been replaced by a wall of the container 10 holding food 11. This wall 12 of food container 10 is placed in direct contact with the conductive layer 6. In both the embodiments of FIG. 1 and FIG. 2, a conventional electrical generator 14 is connected to the split electrodes 2 and 4.

Obviously, other configurations other than the semicircular structure for the split electrodes could be used as long as two separate electrodes exist and they are properly spaced from each other, result in uniform heating across the conductive sheet 8, permit a current flow from one split-electrode configuration through the conductive layer and to the conductive coating 8 and then back through the conductive layer 6 to the other split electrode and also permit enough current to flow in the gap region parallel with the electrodes to heat that region.

By changing the relative area relationship of the two parts of the split electrode, the rate of heat per unit area may be varied or proportioned in the areas above the split electrodes. Total heat output for a given area may be varied by modifying the resistivity or thickness of the conductive layer.

The metallic foil electrodes of the present invention may be made from any suitable electrically conductive metal foil having a thickness generally in the range of 0.0001—0.01 inch. Metal foils of aluminum, copper, stainless steel, tin-plated steel, and the like may be used. The conductive coating may also be made of the same materials as were the electrodes.

The conductive layer may be fabricated of any material having the requisite resistivity and capable of maintaining a good bond and electrical contact with the opposing sheet electrodes. A suitable material is that described in U.S. Pat. No. 3,264,595. Another suitable material is a product called "Temsheet," a trademark product of Armstrong Cork Company. The Temsheet is made by a beater saturation process using cellulosic fibers, although asbestos fibers may be used. Any conventional process such as the so-called alum-ammonia process, may be used to beater saturate the fibers with a suitable amount of the elastomeric binder. A conductive material, usually acetylene black, is introduced into the fibrous slurry prior to the deposition of the rubber binder onto the fibers. Conventional papermaking procedures are used throughout. The final sheet after suitable drying, and perhaps pressing, conducts electricity and generates heat due to the sheet's resistance. The resulting sheet can serve as a heating element. The sheet is anisotropic having an electrical volume resistivity of 7.8 ohms-in. for current flow parallel with the face of the sheet and 67 ohms-in. for current flow perpendicular to the face of the sheet.

In one specific heater which has been used in conjunction with a food container, the heater was made as a 2⅝-inch disc with a 0.125-inch gap between the split electrodes. The conducting layer was 0.033-inch Temsheet having an electrical volume resistivity of 67 ohm-in. as measured in the direction perpendicular to the electrodes. The electrodes were 0.0008-inch copper foil bonded with a simple carbon-loaded electrical-conducting adhesive. The same adhesive was used to bond the aluminum wall of the food container to the top surface of the conductive layer. The heater had a resistance of 2 ohms as measured between the two split electrodes. When a voltage of 10 volts was connected to the two halves of the bottom split electrodes, a current of 5 amps flowed and total power used was 50 watts. Obviously, the heater need not only be used in conjunction with food containers, but has use as a general purpose heater.

What I claim is:

1. A combined disposable container and electrical heater structure comprising a single use disposable metallic container having a substantially flat continuous bottom end portion, a flat continuous electrically conductive layer of compacted, water-laid fibrous material with electrically conductive resistance material incorporated therein conductively attached to the outer surface of said bottom end portion of said container, and substantially conforming in shape and linear dimensions thereto, and two flat spaced-apart electrodes conductively mounted on the outer surface of said fibrous electrically conductive layer and adapted to be connected to a source of electrical current whereby electrical current is passing between the electrodes through the electrically conductive layer and the metallic bottom end portion of the container, said electrodes being of equal surface area and of sufficient size and shape to cover substantially the entire surface of said fibrous conductive layer with the exclusion of the area located between the electrodes, the area between the electrodes being of a width such that excess current will not flow therethrough and yet will allow heat to be generated in the area at substantially the same rate per unit area as heat is generated in the region above the electrodes.